United States Patent [19]
Toda et al.

[11] Patent Number: 5,457,666
[45] Date of Patent: Oct. 10, 1995

[54] LIGHT MODULATION METHOD FOR FORMING A MARK IN MAGNETO-OPTICAL RECORDING SYSTEM

[75] Inventors: Tsuyoshi Toda; Hiroshi Ide, both of Kodaira; Fumiyoshi Kirino, Tokyo; Takeshi Maeda; Hiroyuki Tsuchinaga, both of Kokubunji; Toshimitsu Kaku, Sagamihara; Seiichi Mita, Shiroyama; Kazuo Shigematsu, Saitama, all of Japan

[73] Assignee: Hitachi, Ltd., Tokyo, Japan

[21] Appl. No.: 114,062

[22] Filed: Aug. 31, 1993

[30] Foreign Application Priority Data

Sep. 7, 1992 [JP] Japan ................... 4-238276

[51] Int. Cl.$^6$ .................................. G11B 7/24
[52] U.S. Cl. .................. 369/13; 369/116; 360/59
[58] Field of Search .................... 369/13, 116, 14, 369/15; 360/59, 114; 365/122

[56] References Cited

U.S. PATENT DOCUMENTS

| | | | |
|---|---|---|---|
| 4,894,816 | 1/1990 | Sukeda et al. | 369/116 |
| 4,939,717 | 7/1990 | Ohno et al. | 369/116 |
| 5,084,857 | 1/1992 | Miyauchi et al. | 369/116 |
| 5,257,256 | 10/1993 | Terao et al. | 369/116 |
| 5,337,293 | 8/1994 | Tokita et al. | 369/13 |
| 5,339,298 | 8/1994 | Saito | 369/13 |

FOREIGN PATENT DOCUMENTS

| | | | |
|---|---|---|---|
| 315415 | 5/1989 | Japan | 369/13 |
| 3-22223 | 1/1991 | Japan | |
| 5182272 | 7/1993 | Japan | 369/13 |

*Primary Examiner*—Scott J. Sugarman
*Assistant Examiner*—Tan Dinh
*Attorney, Agent, or Firm*—Fay, Sharpe, Beall, Fagan, Minnich & McKee

[57] ABSTRACT

A magneto-optical disk recording control method using the mark length recording method wherein the marks and gap regions between marks are recorded on the surface of the disk by maintaining a constant temperature distribution during the recording. The laser is driven to a non-recording level in gap regions between marks that exceed a base recording level used for reproduction of the marks. When a mark is recorded, the laser power is increased to a recording power level and after the mark has been recorded, the laser power level is reduced to the base power level, followed by being raised to the gap recording level. Control of the laser is performed by superposing a plurality of pulse trains that are synchronized with respect to a clock having a cycle T. The pulse trains are derived from the code train to be recorded and have pulses with a duration that is an integral multiple of ($\frac{1}{2}$)T. If the pulse width of the recording code train exceeds 2T, then the laser is controlled to reach a first power level in accordance with pulses of a first pulse train, be reduced to the gap recording level and then raised to a second power level in accordance with a second recording pulse train to maintain the temperature distribution constant during the recording of the mark. For the recording of longer marks, the laser is controlled to vary between the second power level and the gap recording level.

25 Claims, 4 Drawing Sheets

LIGHT MODULATION METHOD FOR FORMING A MARK IN MAGNETO-OPTICAL RECORDING SYSTEM

FIELD OF THE INVENTION

The present invention relates to a recording control method for a magneto-optical disk apparatus which performs recording, reproduction and erasure using a laser light beam and an externally applied magnetic field by the mark length recording method.

BACKGROUND OF THE INVENTION

Optical recording, and particularly magneto-optical recording for providing rewritable data file storage systems provides high-density, high-capacity file memories. To record information on a disk of a magneto-optical recording system, an external magnetic field is used to apply a binary code magnetization force to the disk while a laser beam of about 1 μm in diameter is used to apply localized heat to the region concerned and thereby establish the recording of the binary code.

Methods of recording binary code data by laser beam include the mark position recording method and the mark length recording method To record the data "010010", for example, with the mark position recording method, a mark is applied with the laser beam at the center of the data is and the space between two marks, corresponding to two 1s, is regarded as data 0s. With the mark length recording method, on the other hand, at the occurrence of the first 1, the laser beam is used to form the leading edge of a mark at the center part thereof and then form the trailing edge at the center part of the next contiguous 1. When the next 1 is reached, the leading edge is again formed at the center thereof and the recording method is repeated. Thus, the portions between the leading and trailing edges are treated as data 0s.

The emphasis in development of magneto-optical recording systems is focused on increasing the recording capacity and providing an overwrite capability to improve the data transfer rate. To improve the linear recording density, in particular, various techniques have been used with the mark position recording method, such as (1) forming fine magnetic domains, (2) using MCAV (Modified Constant Angular Velocity), which provides a constant disk recording density, (3) using short wavelength light sources, and (4) reducing the track pitch.

Since the mark length recording method utilizes the edges of marks, it has the advantage of enabling higher densities than the mark position recording method. On the other hand, the mark length recording method requires precise control in the length and width of the recording domains, which are effected by variations in the temperature of the environment in which the system is operating.

JP-A-Hei 3-22223 describes a method directed at providing high-precision control of the magnetic domains. In this method, a series of pulse trains are formed that correspond to the length of recording code trains, in which the recording code train length, amplitude and pulse width are controlled in accordance with the length of the reverse phase recording code string that immediately precedes the recording code train. However, it has been difficult to apply such control techniques to the mark length recording method.

With respect to achieving higher recording density, the mark length recording method is more advantageous than the mark position recording method, although the above-described disadvantages regarding precise control of the length and width of the recording domains has made the mark length recording method difficult to implement.

SUMMARY OF THE INVENTION

An object of the present invention is therefore to provide a magneto-optical disk recording control method that resolves the problems associated with the mark length recording method by enabling precise control of the length and width of the recording domains.

According to the invention, the recording laser output power is varied to control the length and width of the recording marks. Several rectangular or square waveforms are used to power the laser, each being an integral multiple of $(½)T$, where T is the period of a clock 30. The signals are superimposed over a constant low-level laser output reproduction or read level $P_r$ in synchronization with clock 30, as shown in FIGS. 1(a) and 1(b).

In particular, with respect to the recording code train 20: (1) a pulse train of 1, 2 or more types of rectangular waveform pulses that are integral multiples of $(½)T$ are formed that rise and fall with the rise and fall of the recording pulses in synchronization with clock 30 to reach the recording level region $P_w$ (where $P_w > P_r$) within the duration of the pulse; (2) the gap between the recording code pulses of the recording code train 20 falls to the low reproduction level $P_r$ in synchronization with clock 30 and after being held at the low level state for a period that is an integral multiple of $(½)T$, is raised to preheat level Ph ($P_r < Ph < P_w$) and erase level Per ($P_r < Per < P_w$) and held at that level until the rise of the next recording code pulse; and, (3) the number of the pulses in the $P_w$ pulse train in (1) above and the length of the holding time in (2) above are each changed depending on the duration of the recording pulse or of the gap between recording pulses.

Here, it is preferable that one, two or more types of rectangular waveform pulses that reach recording level region $P_w$, corresponding to the recording code pulses of the recording code train 20, are provided above the base level of the above preheat level Ph and erase level Per, as shown for example by FIG. 1 (b), as this enables the laser output to be controlled, in principle, from the same base level as the gap.

Or, in such a case, with a pulse train arrangement comprised of one, two or more types of rectangular waveform pulses that reach recording level region $P_w$, corresponding to the recording code pulses of the recording code train 20, a $(½)T$-pulse-width-based pulse train arrangement such as the one shown in FIG. 1 (b) in which there is one leading pulse of level $P_{w1}$ and a pulse width that is an integral multiple of $(½)T$, and one or multiple rear pulses of level $P_{w2}$ of pulse width $(½)T$, is preferable as it decreases the rise time of the leading pulse, facilitating high-precision control. In this case, the relationship between the levels of $P_{w1}$ and $P_{w2}$ will depend on the characteristics of the media irradiated by the laser beam.

Alternatively, a $(½)T$-pulse-width-based pulse train arrangement having one, two or more types of rectangular waveform pulses that reach recording level region $P_w$, and that correspond to the recording code pulses of the recording code train 20 can be used. In this regard, the pulse train can include a multiple pulse group of level $P_{w1}$ and pulse width $(½)T$, followed by one or more rear pulses of level $P_{w2}$ and pulse width $(½)T$. In this case also, the relationship between the levels of $P_{w1}$ and $P_{w2}$ can be: $P_{w1} > P_{w2}$, $P_{w2} > P_{w1}$ and $P_{w1}=P_{w2}$ depending on the characteristics of the media irradiated by the laser beam.

When using only one type of rectangular waveform pulse, the waveform pulses in the same code pulse have the same width and level. When multiple types of rectangular waveform pulses are used, the pulse train includes pulses that differ in at least their width or level, or both. With respect to the above-described pulse types, in either case a difference in pulse spacing is considered to present no problem.

As shown by FIG. 1 (b), for example, all of the rectangular waveform pulses for controlling laser output rise and fall in synchronization with the clock 30, so the widths and spacings, and the above constant level holding time of the rectangular waveform pulses, are all integral multiples of (½)T. Here, the integral of this integral multiple is a number that is selected from the natural series 1, 2, 3, ..., according to the duration of the waveform at each of the points concerned, and the number may be changed depending on the location.

The preheat level Ph and the erase level Per are determined in accordance with the characteristics of the media to which the laser beam is applied. Hereinafter, when these levels are referred to collectively they will be referred to simply as an auxiliary recording pulse level $P_{as}$.

As described above, the laser beam is projected onto the magneto-optical disk at an optical output intensity that is in the recording level region ($P_w$) to thereby heat portions of the disk to the prescribed temperature region for recording. This has the effect of determining the magnetization of those portions, whereby even when the laser beam is removed the prescribed magnetization orientation is maintained and the recording is accomplished.

Consequently, since the recording is accomplished with a laser beam by heating up the disk, the temperature distribution waveform on the disk has to be controlled with high precision, which is generally difficult. For example, as shown by the recording pulse train waveforms in FIG. 1 (a), the waveform of a pulse using the mark length waveform is rectangular. If the disk is subjected to a laser beam at a recording level output with this rectangular waveform, the temperature gradually increases at the portion of the disk corresponding to the mark in accordance with the duration of the rectangular waveform, making it difficult to maintain a constant temperature. Moreover, at the termination of the recording code pulse the temperature falls exponentially, and if the temperature has not fallen sufficiently before the next pulse, the heat applied by the laser beam for the next pulse is added to the latent heat that still remains, whereby the respective temperatures of the pulse and gap portions cannot be maintained constant, causing errors.

By using a recording code pulse of a recording code train comprised by a pulse train of one, two or more types of rectangular waveform pulses that rise and fall with the rise and fall of the recording code pulses and in synchronization with a clock and that reach recording level region $P_w$ ($P_r<P_w$) within the duration of the pulse, the temperature can be increased by the first pulse portion of the recording code pulse, and the temperature can be kept substantially constant by the second pulse portion. If the rectangular waveform pulses are of one type having a pulse width (½)T, the temperature rise can be held to within a prescribed range by including in the second pulse portion a pulse gap that is an integral multiple of (½)T, and if pulses are used that are synchronized with the clock and have two or more differing levels or widths, a substantially constant temperature can be achieved. Further, by using one type of waveform to increase the temperature and the other type to inhibit the increase in temperature, precise control can be obtained. As the increase in the temperature of the portion of the disk irradiated by the laser beam depends on the characteristics of the media, in order to achieve the prescribed temperature level with good precision it is necessary to select a suitable pulse application mode that matches the media characteristics.

In the gap between recording code pulses of the recording code train, the laser output is reduced to a minimum reproduction level $P_r$ in synchronization with the clock, accelerating the decrease in temperature from the temperature level used during recording. After being held temporarily at that minimum level (for a period that is an integral multiple of (½)T), the laser output is raised to a preheat Ph and erase Per level (Pas level) that is below the level used for recording. The laser output is held at that level until the rise of the next recording code pulse, whereby, in contrast to the period during which the laser beam was held at the minimum level for temperature decrease, at the preheat level Ph and erase level Per (Pas level) the laser output added to the (preheated) rising temperature portion makes it possible to apply a correction that enables a quick rise in power to the recording region while also permitting a constant gap portion temperature to be achieved.

The duration of recording pulses and of the gap between recording pulses varies according to the data that is to be recorded. By the present invention, a constant temperature can be achieved by changing the number of pulses in the $P_w$ pulse train during the recording of a mark in accordance with the pulse train being recorded, and by changing the duration of the holding times for the minimum and preheat laser output levels.

To achieve a constant temperature, the present invention uses pulses synchronized by a clock so that pulse width, pulse spacing and constant level holding time and the like are all limited to an integral multiple of (½)T, and by also using low level pulses for recording, reproduction and erasure and the like. In this way, control is readily accomplished without the requirement of special devices. Also, one method of the present invention, whereby recording is done using pulses that reach the recording level region $P_w$ superposed over the erase level Per, can be applied to overwriting.

Thus, in accordance with the present invention, high-precision recording becomes readily possible even using the mark length recording method, and high density is also thereby accomplished.

DETAILED DESCRIPTION OF THE PREFERRED EMBODIMENTS

A first embodiment of the recording method of the present invention is explained with reference to FIGS. 1(a)–1(d) and FIG. 2. According to the first embodiment of the invention, the laser power applied during recording on a magneto-optical disk according to the mark length recording method, uses recording pulse trains 21a, 21b and 22 for recording the code train 20, which represents data to be recorded, in synchronization with a clock 30. More specifically, each of the pulse trains is a rectangular pulse waveform that rises and falls in accordance with clock 30 for a duration of an integral multiple of (½)T, where T is the cycle of clock 30.

Figure 1A:
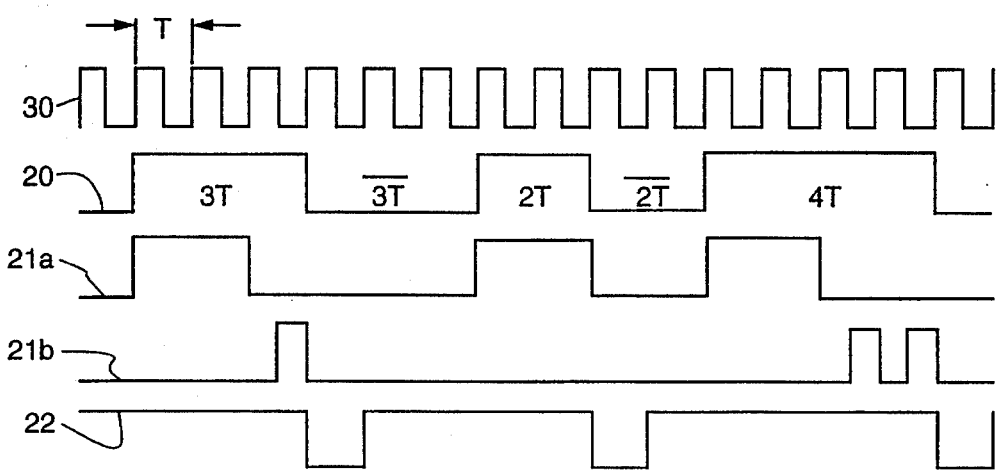
FIG. 1(a) is a timing diagram showing the relationship between a clock signal, recording code train and recording pulse trains.
Figure 1B:
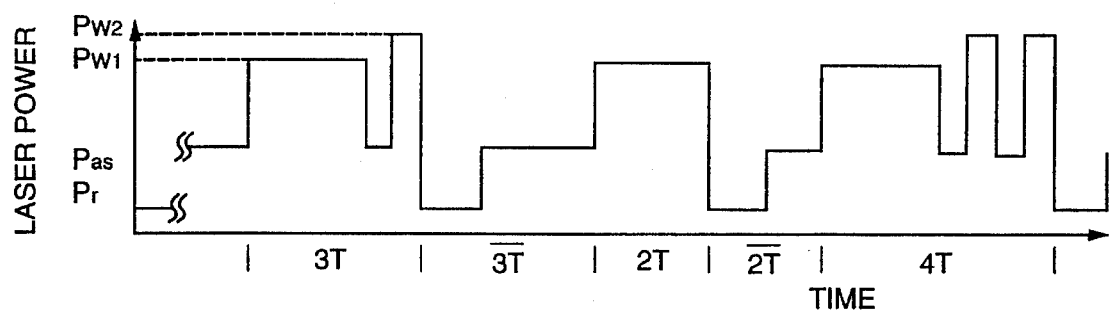
FIG. 1(b) is a diagram of laser power output over time during the recording of the recording code train shown in FIG. 1(a).

To form a mark in a conventional manner, the laser power is provided in accordance with a single rectangular waveform that provides a constant output for a predetermined amount of time to record the mark. This causes an increase in temperature to occur throughout the duration of the pulse that is applied. According to the present invention, however, when a mark is to be recorded, the leading edge of the mark is recorded with a leading pulse synchronized with clock 30, followed by a rear pulse, also synchronized with clock 30. The relationship between the leading and trailing or rear pulses with respect to clock 30 is shown in FIG. 1(a) and FIG. 1(b). In particular, recording pulse train 21a is superposed with recording pulse train 21b over low level recording pulse train 22 to provide a change in laser power level as shown in FIG. 1(b).

First, it is assumed that the laser power is set at a low preheat or erase level, Pas that is applied along with the recording pulse waveforms 21a and 21b, and is generally at a predetermined level depending on the media characteristics. This low level recording pulse train is applied to the laser substantially continuously, except when a mark has been just completed. When a next mark is to be recorded after a gap, according to the first embodiment, a pulse of pulse train 21a is combined with the low level signal $P_{as}$ to power the laser to a level $P_{w1}$. After a predetermined integral multiple of (½)T, the pulse applied by waveform 21a falls so that the laser power is returned to power level $P_{as}$, provided by pulse train 22. Then, after another predetermined integral multiple of (½)T, for example (½)T as shown in FIG. 1(a), the laser power level is switched to $P_{w2}$ by pulse train 21b and held there for an integral multiple of (½)T, for example (½)T, as shown in FIG. 1(a). After a mark is recorded, the temperature is reduced on the media surface abruptly by decreasing the laser power to a read level $P_r$, as shown in FIG. 1(b), by the falling edge of pulse train 22. The laser power is held at the read level $P_r$ for an integral multiple of (½)T, for example 1T, and then raised to power level $P_{as}$ and held there until the power is increased to $P_{w1}$ by pulse train 21a, in accordance with the recording code train 20. This process is repeated in accordance with the recording code train 20 by altering the timing of the recording pulse trains 21a, 21b and 22 in accordance with an integral multiple of (½)T of clock 30.

Figure 1C:
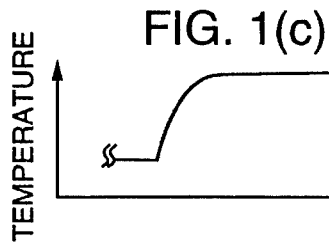
FIG. 1(c) is a diagram of recording disk surface temperature over time for the recording of the recording code train of FIG. 1(a).

As shown in FIG. 1(c), by the first embodiment of the present invention, the temperature of the media surface is first increased abruptly by applying the laser power at level $P_{w1}$ holding the power level constant at $P_{w1}$ for an integral multiple of (½)T. Then, to counteract a heat build-up effect on the surface of the recording media, the power of the laser is switched to level $P_{as}$ for (½)T and then increased to level $P_{w2}$ in order to maintain the temperature at a constant level for the accurate recording of the mark. At the end of the recording of the mark, the laser power is returned to the level $P_r$, and the temperature falls at the surface of the recording media to provide a gap between successive pulses. The gap is formed continuously until the start of the next mark, even though the power level of the laser is shown to be raised to level $P_{as}$ from level $P_r$ after the elapse of (1)T.

According to the first embodiment of the present invention, a recording pulse of, for example, 3T in recording code train 20 by switching between three different power levels ($P_{as}$, $P_{w1}$ and $P_{w2}$) by the laser. This causes the temperature of the mark being recorded on the media surface to cool slightly during the recording, as shown in greater detail in FIG. 2. Specifically, prior to recording a mark, the laser power is set at $P_{as}$ for a duration $E_1$. This causes a temperature on the surface of the disk to be at a gap temperature $E_2$, where no mark is recorded. Then, a pulse corresponding to the data to be recorded (represented by recording code train 20) is recorded by forming a mark. With reference to the recording code train shown in FIG. 1(a), the first mark is formed by a pulse having a duration of the sum of A1, B1 and C1. In particular, first the laser power is raised to $P_{w1}$ for a duration A1 to increase the temperature, as shown by curve A2. Then, the laser power is decreased to level $P_{as}$ for a duration of $B_1$ to decrease the temperature of the recording media, as shown by curve $B_2$. Finally, the laser power is raised to the level $P_{w2}$ for a duration $C_1$ to again cause the temperature on the disk surface to increase, as shown by curve $C_2$. After recording of the pulse, a gap is formed, i.e. a trailing edge of the mark is formed by reducing the laser power to a level $P_r$ for a duration $D_1$ causing the temperature on the surface of the disk to abruptly decrease, as shown by curve $D_2$. Finally, the laser power is increased to level $P_{as}$ to continue the gap level until a new mark is to be recorded in accordance with the code train 20.

Figure 2:
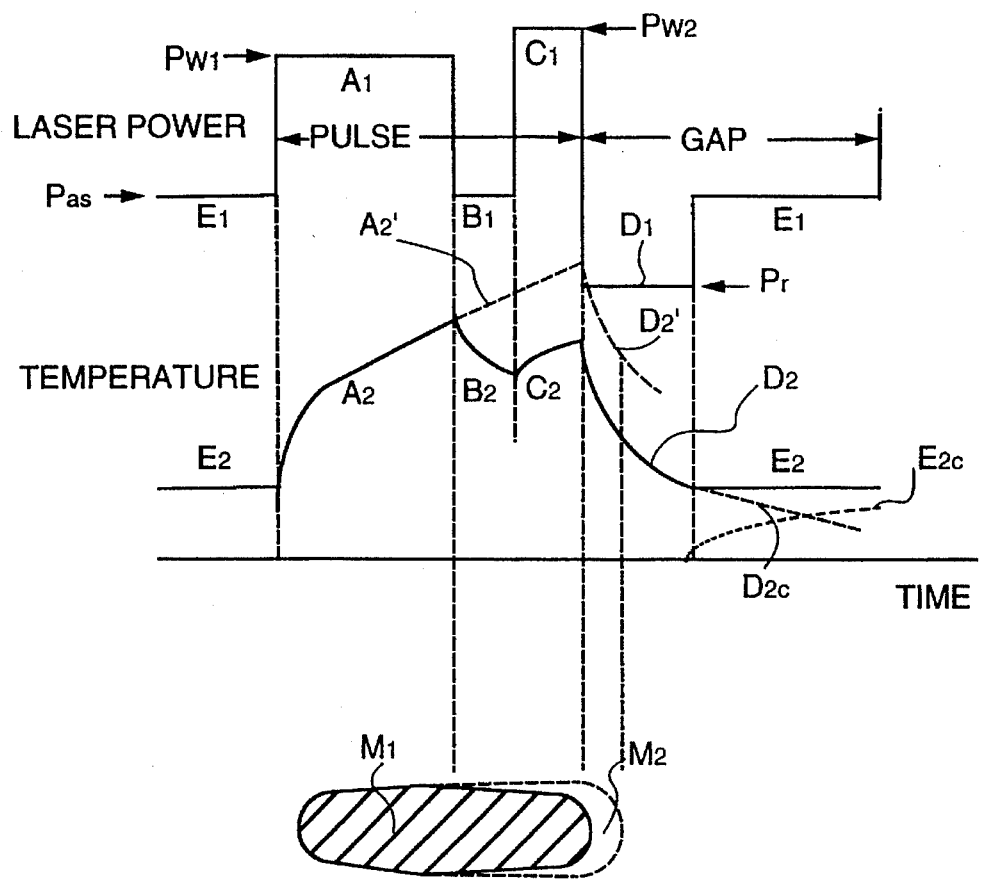
FIG. 2 is a timing diagram showing the relationship between laser power and temperature of a recording disk surface for recording a mark according to the invention as compared with the prior art.

FIG. 2 shows the relationship between a mark $M_1$ recorded according to the method of the present invention and a mark $M_2$ recorded in a conventional manner. Specifically, if the pulse to be recorded in accordance with code train 20 were recorded in a conventional manner, the laser would be powered at a predetermined level to cause the temperature of the recording media to be increased linearly along curve $A_2$, for the duration of the recording code pulse ($A_1+B_1+C_1$) and then decrease along curve $D_2$, to form an undesirable thermal build-up portion along the trailing edge of the mark, represented by $M_2$. This effect is resolved by the present invention by first reducing the laser output to level $D_1$ ($P_r$) to accelerate the decrease in temperature curve $D_2$, and then to increase the power level to $E_1$ ($P_{as}$). The constant level $E_2$ is achieved by combining the component temperature curves $D_{2c}$ and $E_{2c}$, which component curves are shown in phantom lines in FIG. 2.

Figure 1D:
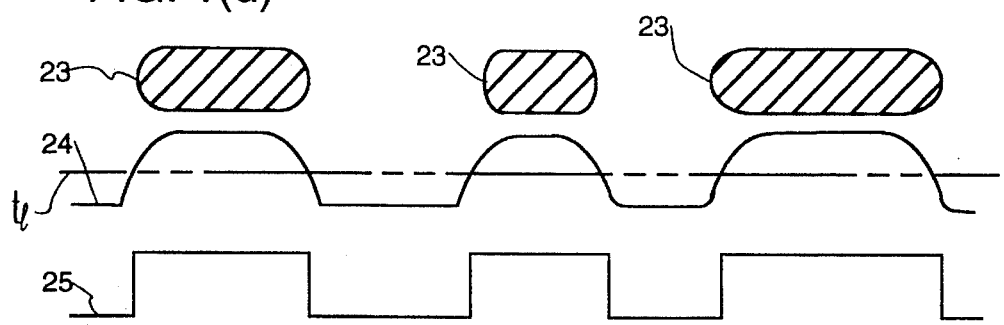
FIG. 1(d) is a diagram showing the relationship between recording marks, the reproduction signal and the reproduction code train.

As a result of recording marks that have a symmetrical shape, for example mark 23 shown in FIG. 1(d), a reproduction signal 24 can be formed during reading of the mark with the laser power at level $P_r$. In particular, by processing reproduction signal 24 to extract that portion of the signal greater than a threshold level signal $t_l$, a reproduction code train 25 can be formed that accurately reproduces the originally recorded code train 20.

The duration of the laser power during the recording of a pulse at the level $P_{as}$, $P_{w1}$ and $P_{w2}$ varies in accordance with the code train 20 being recorded, as shown in FIG. 1(a). For example, if a pulse of code train 20 is to be recorded for a duration of 2T, the power of the laser is raised to $P_{w1}$ for a duration of 2T and then decreased to level $P_r$ for a duration of 1T. On the other hand, when the pulse of code train 20 has a duration of 4T, the pulse waveform 21a increases the laser power to $P_{w1}$ for (2)T, and then reduces the power to $P_{as}$ for (½)T. This is followed by raising the power to $P_{w2}$ by a rear pulse from pulse train 21b, followed by a decrease to $P_{as}$, and then another increase to $P_{w2}$. The $P_{w2}$ level is reached for a duration of (½)T each time. Finally, at the trailing edge of the 4T pulse, the pulse waveform 21b falls as does the pulse waveform 22 to reduce the laser power to the read level $P_r$.

In each of the instances of recording explained with respect to the first embodiment, the laser power is first raised to a laser power level of $P_{w1}$, and then to a higher power level $P_{w2}$ after a decrease in the laser power level to $P_{as}$ for a duration of (½)T. This is merely an example of a specific application of the method of the present invention to one particular type of many known recording media that the method can be applied to. This provides a level or constant temperature distribution across the surface of the disk during the recording of the mark, as shown in FIG. 1(c).

Figure 3:
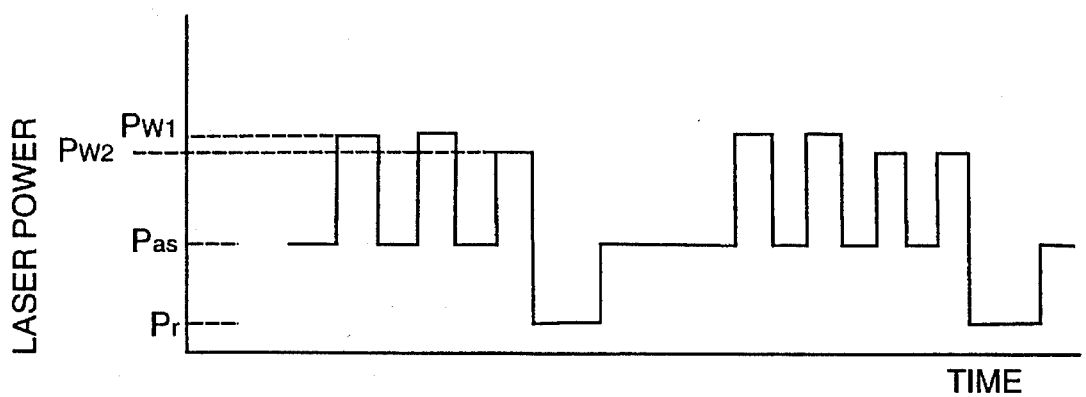
FIG. 3 is a diagram of change in laser power over time for recording a pulse code train according to a second embodiment of the present invention.

The desired constant temperature distribution during recording of a mark can be obtained in some instances, depending upon the composition of the recording media, for example, by changing the level in laser power over time as shown by the second embodiment of the invention in FIG. 3. In the recording method shown in FIG. 3, the laser power is raised from level $P_{as}$ to $P_{w1}$ for a short duration, (½)T for example, and then returned to level $P_{as}$ for a duration of (½)T, twice. Thereafter, the laser power is raised to level $P_{w2}$, which is less than $P_{w1}$ in this embodiment for a duration of (½)T. For certain types of recording media, reducing the laser power to the $P_{w2}$ level for the rear pulse of the mark being recorded insures that the temperature distribution remains constant during recording and that the trailing end of the mark ends at the intended point when the laser power is finally dropped to the $P_r$ level.

Figure 4A:
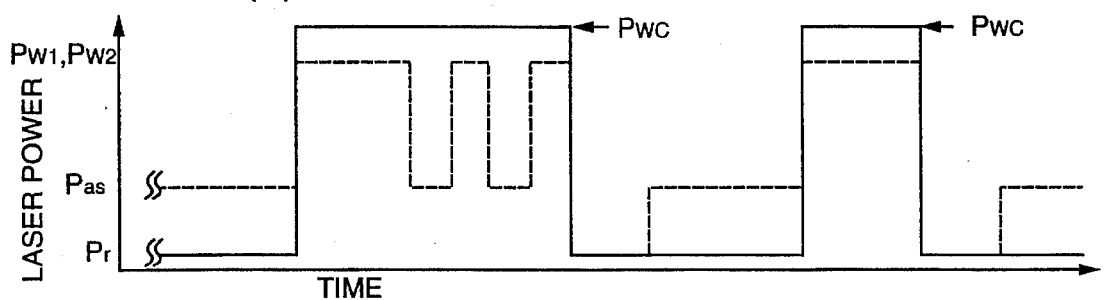
FIG. 4(a) is a diagram showing a comparison of change in laser power over time according to a conventional method for recording and in accordance with a fourth embodiment of the recording method of the present invention.

Also, the invention is not limited to using two different power levels for the recording pulse trains, and in FIG. 4(a), the power levels $P_{w1}$ and $P_{w2}$ are set equal to one another. The important aspect of the invention is that the laser power that is provided by superimposing a plurality of waveforms that are synchronized with the clock (preferably the clock that is used for synchronizing the read/write operation) and the power levels and duration thereof are adjusted during the recording to maintain a constant temperature distribution across the surface of the disk for both mark and gap formation.

Figure 4B:
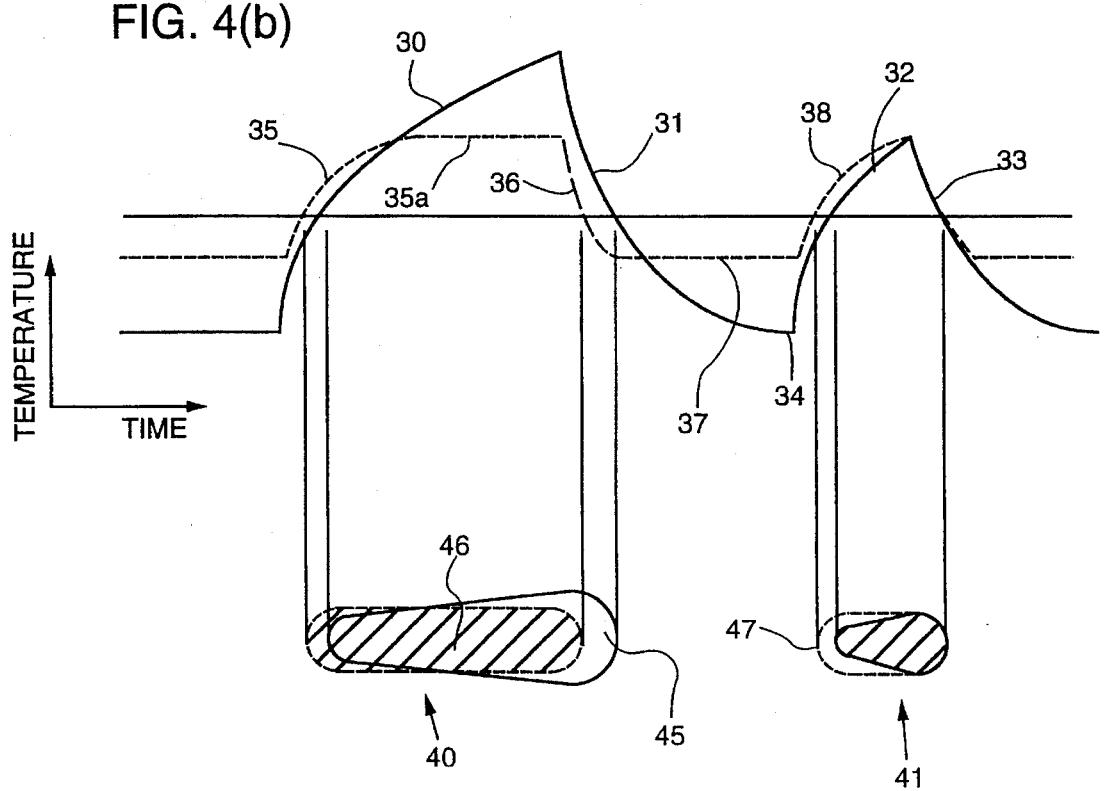
FIG. 4(b) is a diagram showing a comparison of the temperature of a disk surface over time during recording by a conventional recording method and by the recording method of the embodiment of the present invention shown in FIG. 4(a).

The problem with conventional methods of mark length recording using a laser for recording a mark on a magneto-optical disk are diskussed in greater detail herein with respect to FIGS. 4(a) and 4(b). Specifically, a conventional application of laser power for recording a mark is shown in FIG. 4(a) by a solid line, while a method according to a third embodiment of the present invention wherein the power levels $P_{w1}$ and $P_{w2}$ of pulse trains 21a, 21b, respectively, are set to be equal as shown by a dashed line in FIG. 4(a). In FIG. 4(b), a temperature distribution curve is shown by a solid line for the conventional method of recording a mark and the temperature distribution curve generated by the recording method of the third embodiment of the present invention is shown by a dashed line.

According to the conventional method, the laser power is held at a level $P_r$ prior to recording a mark. Then the power is increased to a level $P_{wc}$ and held at that level for the duration of the recording code pulse. This causes the temperature on the surface of the disk to increase as shown by curve 30 in FIG. 4(b). As a result of a thermal build-up effect, the temperature distribution steadily increases for the duration of the pulse width until the power level is decreased to $P_r$. This causes the temperature to decrease as shown by curve 31 to form the trailing end of the mark and begin the formation of a gap. Then, when a next mark is to be recorded, the laser power is increased again to level $P_{wc}$ from level $P_r$ and the temperature increases as shown by curve 32 to begin recording the next mark 41. After the duration of the code pulse elapses, the laser power is returned to level $P_r$ thereby ending the recording of the mark 41 and causing a decrease in the temperature of the surface, as shown by curve 33.

In the recording method of the third embodiment of the invention shown in FIG. 4(b), the power of the laser is held at level $P_{as}$ during gap formation and is then increased for recording a mark 40 to a level $P_{w1}$, $P_{w2}$. Following a predetermined duration that is an integral multiple of (½)T, the laser power is decreased to level $P_{as}$. Then the laser power is increased to level $P_{w1}$, $P_{w2}$ twice more for a duration of (½)T with an intermittent decrease of the laser power to level $P_{as}$ for a duration of (½)T. Thereafter, the laser power is reduced to level $P_r$ for a duration of (1)T, for example, to form the trailing end of mark 40. By this embodiment of the invention, as shown in FIG. 4(b), the temperature of the surface of the disk rises from a pre-recording level along curve 35 to a level region 35a. Thus, in comparison to the temperature distribution curve 30 achieved by the conventional recording method, the recording method of the third embodiment (and also for the first and second embodiments) provides a constant temperature distribution that avoids the thermal build-up effect characteristic of conventional recording methods. This has the advantage that when the laser power is reduced to level $P_r$ to form the trailing end of mark 40, the temperature decreases more quickly, as compared with the decrease in temperature represented by curve 31 for the conventional method. Thus, by the present invention, the trailing edge of mark 40 is formed with greater precision. Furthermore, since according to the present invention, the power of the laser is increased to level $P_{as}$, even when a gap is to be present between two marks, the temperature levels off at a constant value as represented by curve 37 so that the temperature can be quickly increased by driving the laser power to the recording level $P_{w1}$, $P_{w2}$ at the beginning of a mark.

The temperature distribution curve attained by the conventional recording method as shown by the solid line in FIG. 4(b) illustrates a thermal interference effect known to occur with conventional recording methods. In particular, when the trailing edge of mark 40 is to be formed by the conventional method, the temperature of the disk does not decrease so quickly and an enlarged trailing portion 45 is generated outside the shaded area 46, which is the intended area in which the mark should be recorded. On the other hand, according to the present invention, since the temperature of the surface of the disk is maintained at a level value as shown by portion 35a of the temperature distribution curve, the trailing edge of mark 40 is formed to be coincident with the shaded portion 46, as intended. Next, when a mark 41 is to be recorded after a gap is formed between the marks, the temperature of the recording media has decreased to a level 34 according to the conventional method, so the mark is not formed so quickly in response to increasing the laser power to the recording level. This causes the leading edge of the mark 41 to be formed behind the intended leading edge indicated by the dashed perimeter line 47, and the recording mark 41 is not formed as intended. On the other hand, since the disk media surface temperature is maintained at a constant level 37 in the gap according to the present invention, application of power to the laser at a level of $P_{w1}$, $P_{w2}$ causes the leading edge of mark 41 to be formed in coincidence with the intended leading edge line 47.

Figure 5:
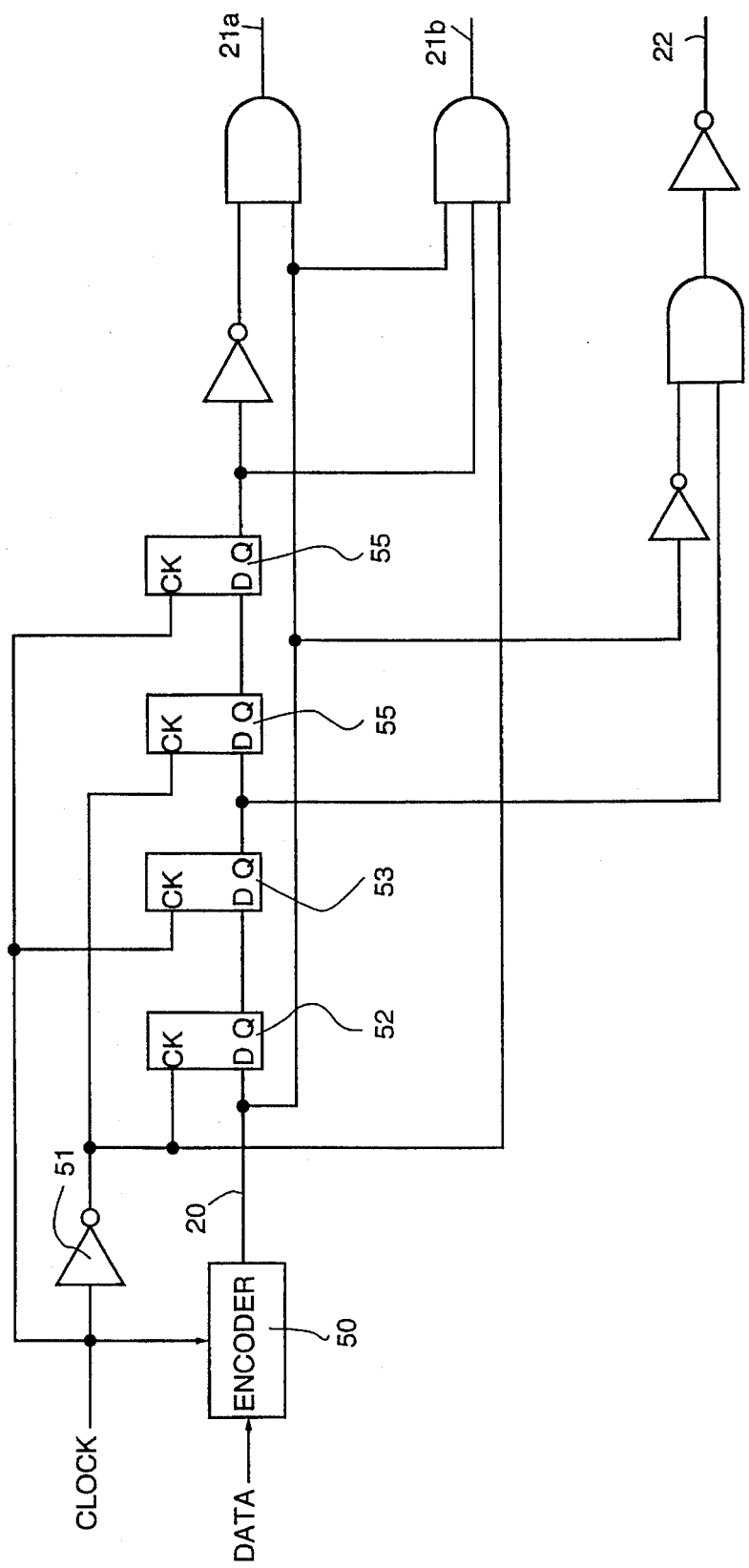
FIG. 5 is a circuit diagram showing the components of a circuit that provides the rectangular waveform pulses or recording pulse trains used for recording according to the first embodiment of the present invention.

Since the method of the present invention involves combining or superimposing a plurality of recording pulse trains, for example pulse trains 21a, 21b and 22 in FIG. 1(a), each being of rectangular waveform, the control of the laser power is suited to digital processing for generating the recording pulse trains. This is advantageous since the recording pulse trains are synchronized with the clock cycle, each pulse being an integral multiple of (½)T of the clock. FIG. 5 shows a digital circuit that can be used for providing recording pulse trains 21a, 21b and 22. Data is encoded by a conventional data encoding method, such as a nonreturn-to-zero (NRZI) method or a run length limited (RLL) code method by encoder 50. The recording code train 20 is output from encoder 50 and is synchronized with the clock signal. Preferably, the clock signal is the one used for synchronizing the read/write operations or to a clock cycle T of a clock having the shortest clock cycle used for synchronizing read/write operations. Preferably such a clock has a standard 50-50 duty cycle.

With reference to FIG. 5, the (½)T duration pulse widths are obtained by inverting the clock output with an inverter 51 and inputting the non-inverted and inverted clock outputs to a series of D-flip flops 52–55. The D-flip flops provide delays that enable the pulses of the recording pulse trains 21a, 21b and 22 to be an integral multiple of (½)T in duration. The remainder of the circuit is configured for explaining the method of providing the timing of the waveforms 21a, 21b and 22, as shown in FIG. 1(a). These timing signals can be used to switch the laser power source to the predetermined levels, in accordance with the various embodiments of the invention, and further description of the operation of the circuit is unnecessary since it is apparent to one having ordinary skill in the art.

The foregoing description of the invention has been presented for purposes of illustration and description. It is not intended to be exhaustive or to limit the invention to the specific disclosure set forth herein. Obvious modification and variations are possible in light of the above teachings. It is intended that the scope of the invention be defined by the claims appended hereto.

We claim:

1. A magneto-optical disk recording method using a laser for recording data by a mark length recording method, comprising the steps of:

recording a data code train having pulses by forming marks on a recording surface of the disk corresponding in length to a pulse width of the pulses;

generating a plurality of superposed recording pulse trains derived from the data code train and synchronized with a clock having a cycle T, each of said pulse trains having pulses of a duration that is an integral multiple of (½)T and each representing at least first, second, third and fourth laser power levels, wherein said fourth power level is a reproduction power level, said third power level is an auxiliary power level that is at least one of an erase or preheat level greater than said reproduction power level, and wherein said first and second power levels are recording power levels greater than said third and fourth power levels for forming the mark; and controlling the laser power during the recording with said plurality of superposed recording pulse trains including forming a mark by first driving the laser to said first and second power levels from said third power level to begin recording the mark and then forming a gap by second driving the laser to said fourth power level for a predetermined integral multiple of (½)T and then to said third level for forming a gap region following the recorded mark.

2. A magneto-optical disk recording method according to claim 1, wherein said generating includes generating first and second ones of said pulse trains for said first and second power levels, respectively, and further generating a third pulse train having pulses of a duration that are an integral multiple of (½)T for said third power level; and wherein said first driving includes driving the laser to said first power level and then to said third power level, followed by driving said laser to said second power level from said third power level to record a rear portion of the mark.

3. A magneto-optical disk recording method according to claim 1, wherein said first driving drives the laser to said first power level for a duration of 2T when the pulse width of the data code train being recorded is 2T.

4. A magneto-optical disk recording method according to claim 2, wherein said first driving drives the laser to said first power level for a duration of 2T, drives the laser to said third power level for a duration of (½)T and then drives the laser to said second power level for a duration of (½)T when the pulse width of the data code train being recorded is of a duration of 3T.

5. A magneto-optical disk recording method according to claim 2, wherein said first driving drives the laser to said first power level for a duration of 2T, drives the laser to said third power level for a duration of (½)T and then repeatedly drives the laser to said second power level for a duration of (½)T followed by driving the laser to said third power level for a duration of (½)T for the remainder of the pulse width of the data code train being recorded, when the pulse width of the data code train being recorded is of a duration exceeding 3T.

6. A magneto-optical disk recording method according to claim 2, wherein said second power level is greater than said first power level.

7. A magneto-optical disk recording method according to claim 2, wherein said first power level is greater than said second power level.

8. A magneto-optical disk recording method according to claim 2, wherein said first power level is equal to said second power level.

9. A magneto-optical disk recording method using a laser for recording data by a mark length recording method, comprising the steps of:

recording a data code train having pulses by forming marks on a recording surface of the disk;

generating at least first, second and third superposed recording pulse trains from said data code train that have pulses for powering the laser to first, second and third power levels, respectively, each of said first, second and third power levels being above a base power level for reproduction of the marks, said recording pulse trains being synchronized with a clock having a cycle T and each having a pulse width duration that is an integral multiple of (½)T;

controlling the laser power during the recording with said superposed recording pulse trains by maintaining the laser power at said third power level for recording a first gap region preceding the forming of a mark; and forming a mark by driving said laser to the first, second and third power levels; and then forming a second gap region by driving the laser to decrease the laser power to the base power level after the forming of the mark followed by increasing the laser power to the third power level to repeat the step of maintaining the laser power at the third level in the second gap region until a next mark is to be recorded.

10. A magneto-optical disk recording method according to claim 9, wherein said forming a mark further includes driving said laser during the recording of the mark from said second power level to said first power level and then to said third power level for maintaining a constant temperature distribution on the surface of the disk for the length of the mark being recorded.

11. A magneto-optical disk recording method according to claim 9, wherein said forming a mark includes driving the laser to said first power level for a duration of 2T when the pulse width of the data code train being recorded is 2T.

12. A magneto-optical disk recording method according to claim 10, wherein said forming a mark includes driving the laser to said first power level for a duration of 2T, driving the laser to said third power level for a duration of (½)T and then driving the laser to said second power level for a duration of (½)T when the pulse width of the data code train being recorded is of a duration of 3T.

13. A magneto-optical disk recording method according to claim 10, wherein said forming a mark includes driving the laser to said first power level for a duration of 2T, driving the laser to said third power level for a duration of (½)T and then repeatedly driving the laser to said third power level for a duration of (½)T followed by driving the laser to said second power level for a duration of (½)T for the remainder of the pulse width of the data code train being recorded, when the pulse width of the data code train being recorded is of a duration exceeding 3T.

14. A magneto-optical disk recording method according to claim 10, wherein said second power level is greater than said third power level.

15. A magneto-optical disk recording method according to claim 10, wherein said third power level is greater than said second power level.

16. A magneto-optical disk recording method according to claim 10, wherein said first power level is equal to said second power level.

17. A magneto-optical disk recording method using a laser for recording data by a mark length recording method, comprising the steps of:

forming marks on a recording surface of the disk representing a data code train to be recorded;

controlling the forming by varying the laser power during recording of a mark among first PW1 and second PW2 recording power levels and a first non-recording power level Pas to provide a constant temperature distribution curve on the surface of the disk during the forming of the mark; and decreasing the power level of the laser to a second non-recording power level less than said first non-recording level after forming the mark followed by increasing the laser power to said first non-recording level for creating a gap region following said recorded mark.

18. A magneto-optical disk recording method according to claim 17, wherein said first and second recording power levels and said first and second non-recording power levels are generated from recording pulse trains synchronized with a clock having a cycle T and derived from said code train, wherein the power levels are sustained for an integral multiple of (½)T.

19. A magneto-optical disk recording method, comprising the steps of:

forming marks with gaps therebetween on a recording surface of the disk corresponding in length to pulse widths of a data code train to be recorded;

controlling the laser power with a plurality of superposed rectangular waveform pulse trains synchronized with a clock having a cycle T, wherein each of said pulse trains has a pulse duration that is an integral multiple of (½)T, wherein a first one of said pulse trains has pulses for supplying an auxiliary power level to the laser that exceeds a base power level, said base power level being set for reproduction of the recorded data code train, and wherein a second one of said pulse trains has at least two recording power levels for supplying power to the laser at a power level exceeding said auxiliary power level, and wherein pulses of said first pulse train have a falling edge coincident with a falling edge of the second pulse train to reduce the laser power to the base power level after the forming of a mark; and driving said laser to increase the laser power from said base power level after the forming of a mark to said auxiliary power level with said first pulse train to generate a constant temperature distribution curve in a gap region following the recorded mark.

20. A magneto-optical disc recording method according to claim 19, wherein said controlling of the laser power with a plurality of superposed pulse trains includes controlling the laser power with a third rectangular waveform pulse train superposed with said first and second pulse trains, synchronized with the clock and having a pulse duration that is an integral multiple of (½)T; and said driving of said laser includes forming a mark by first driving the laser to a first one of said recording power levels PW1 with said second pulse train for a predetermined integral multiple of (½)T followed by decreasing the laser power to said auxiliary power level and then increasing the laser power to a second one of said recording power levels with a pulse from said third pulse train.

21. A magneto-optical disk recording method according to claim 20, wherein said second recording power level is greater than said first recording power level.

22. A magneto-optical disk recording method according to claim 20, wherein said first recording power level is greater than said second recording power level.

23. A magneto-optical disk recording method according to claim 20, wherein said first recording power level is equal to said second recording power level.

24. A magneto-optical disk recording method according to claim 18, wherein said varying of the laser power during recording of a mark includes driving the laser power to said first recording power level followed by driving the laser power to said first non-recording power level and further followed by driving said laser power to said second recording power level during the recording of the mark.

25. A magneto-optical disk recording method according to claim 17, wherein said first and second recording power levels and said first and second non-recording power levels are generated from a plurality of superposed recording pulse trains synchronized with a clock having a cycle T and derived from said code train, wherein the power levels are sustained for an integral multiple of (½)T.

* * * * *